US010568408B2

(12) United States Patent
Meillan

(10) Patent No.: US 10,568,408 B2
(45) Date of Patent: Feb. 25, 2020

(54) SUSPENSION DEVICE FOR HANGING SEATS AND HAMMOCKS

(71) Applicant: LA SIESTA GMBH, Jugenheim (DE)

(72) Inventor: Jean-Christophe Meillan, Ingelheim (DE)

(73) Assignee: LA SIESTA GMBH, Jungenheim (DE)

(*) Notice: Subject to any disclaimer, the term of this patent is extended or adjusted under 35 U.S.C. 154(b) by 0 days.

(21) Appl. No.: 16/048,870

(22) Filed: Jul. 30, 2018

(65) Prior Publication Data

US 2019/0365084 A1 Dec. 5, 2019

(30) Foreign Application Priority Data

Jun. 5, 2018 (DE) .................. 10 2018 113 371

(51) Int. Cl.
A45F 3/24 (2006.01)
F16G 11/10 (2006.01)
A47C 3/02 (2006.01)

(52) U.S. Cl.
CPC .................. A45F 3/24 (2013.01); A47C 3/02 (2013.01); F16G 11/103 (2013.01)

(58) Field of Classification Search
CPC ............. A45F 3/24; A47C 3/02; F16G 11/103
USPC ................. 248/328, 65, 71; 24/129 R, 129 B
See application file for complete search history.

(56) References Cited

U.S. PATENT DOCUMENTS

| 619,915 | A | * | 2/1899 | Wentworth | ............... F16L 3/04 248/65 |
| 2,193,236 | A | * | 3/1940 | Meighan | ................. F16G 11/14 24/129 R |
| 4,222,157 | A | | 9/1980 | Forman | |
| 5,950,556 | A | | 9/1999 | Liebe | |
| 2009/0282653 | A1 | * | 11/2009 | Yang | ........................ A43C 7/00 24/129 R |

FOREIGN PATENT DOCUMENTS

| DE | 20 2011 105 043 U1 | 5/2012 |
| DE | 20 2013 104 462 | 12/2013 |
| DE | 20 2013 104 462 U1 | 12/2013 |

* cited by examiner

Primary Examiner — Muhammad Ijaz
(74) Attorney, Agent, or Firm — Hauptman Ham, LLP

(57) ABSTRACT

A suspension device for hanging seats and hammocks including apertures arranged in a basic body for receiving and guiding a suspension rope. The basic body is realized in at least two parts and is composed of an upper part which receives the suspension rope to be length-adjustable and a lower part which is movably mounted on the upper part and comprises at least one holding body for the fastening of the hanging seat or the hammock. A first aperture enters into the upper part of the basic body approximately at the top for receiving and guiding the suspension rope and exits out of the upper part again from a side outlet opening. A second aperture extends in the upper part of the basic body and exits from the upper body on both sides and comprises an inlet opening below the side outlet opening of the first aperture.

14 Claims, 6 Drawing Sheets

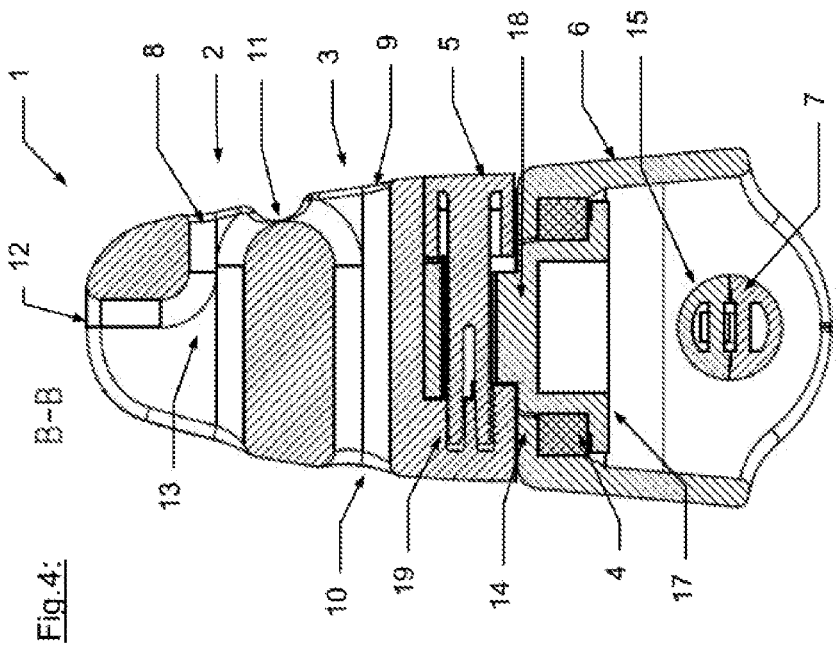
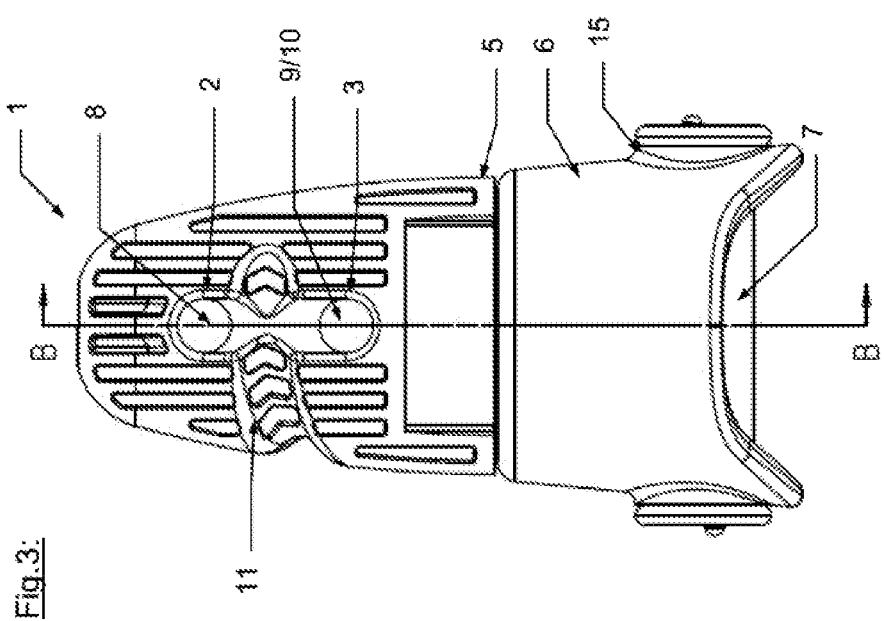

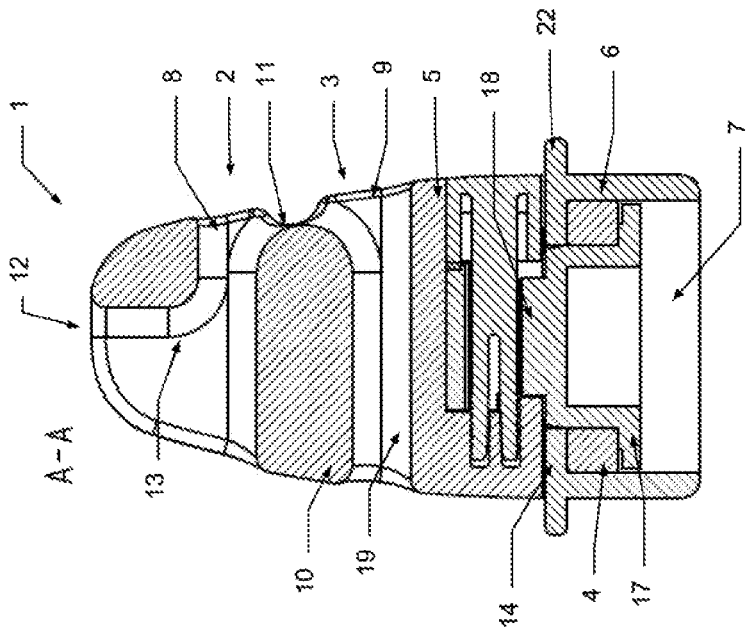
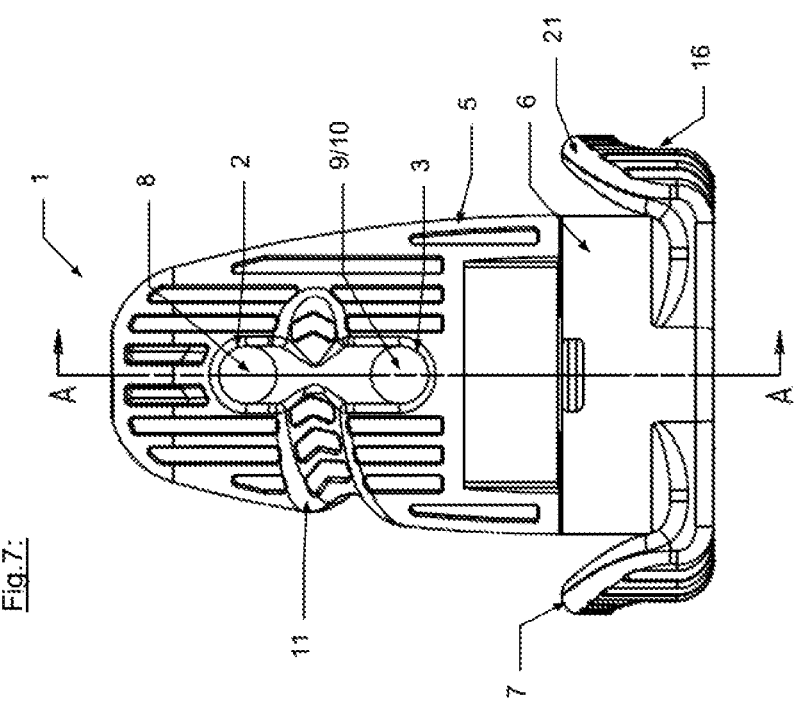

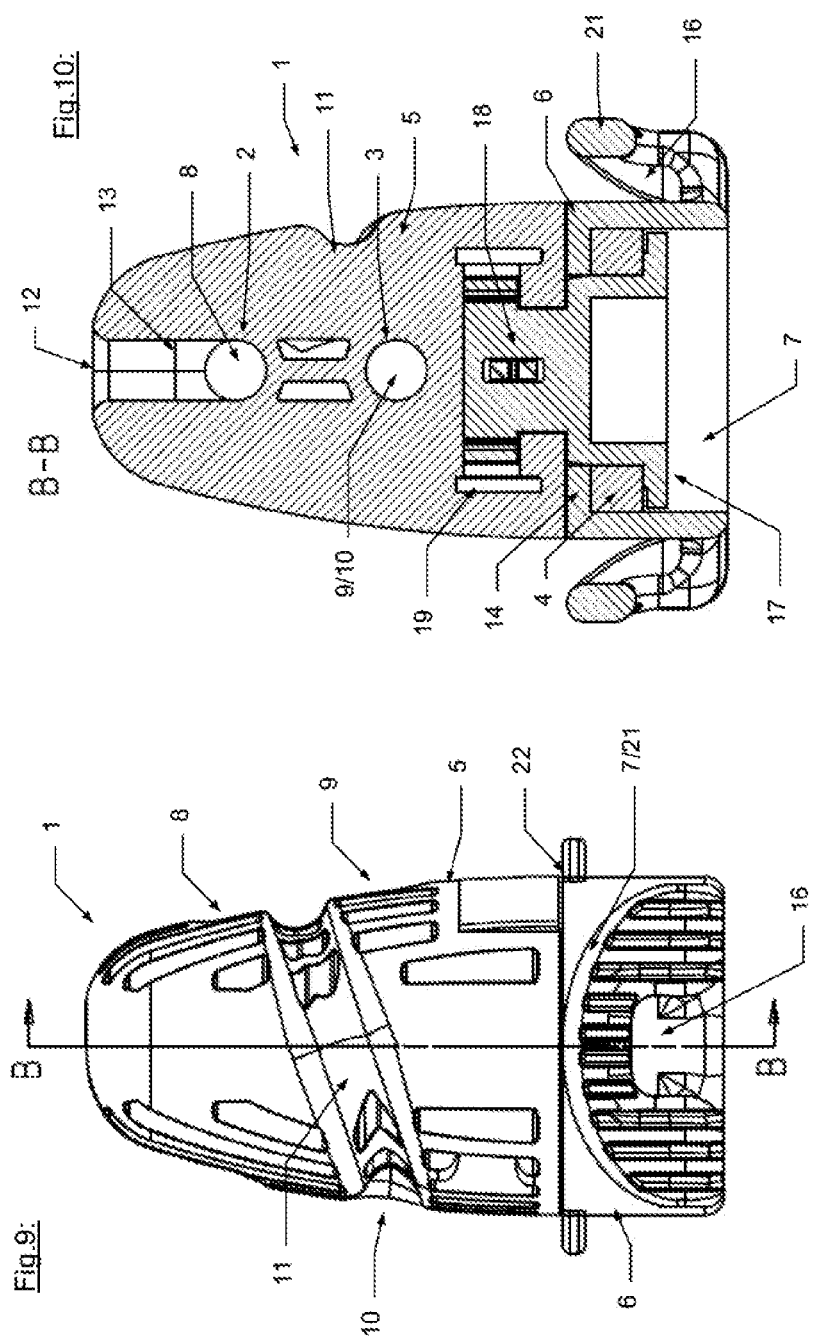

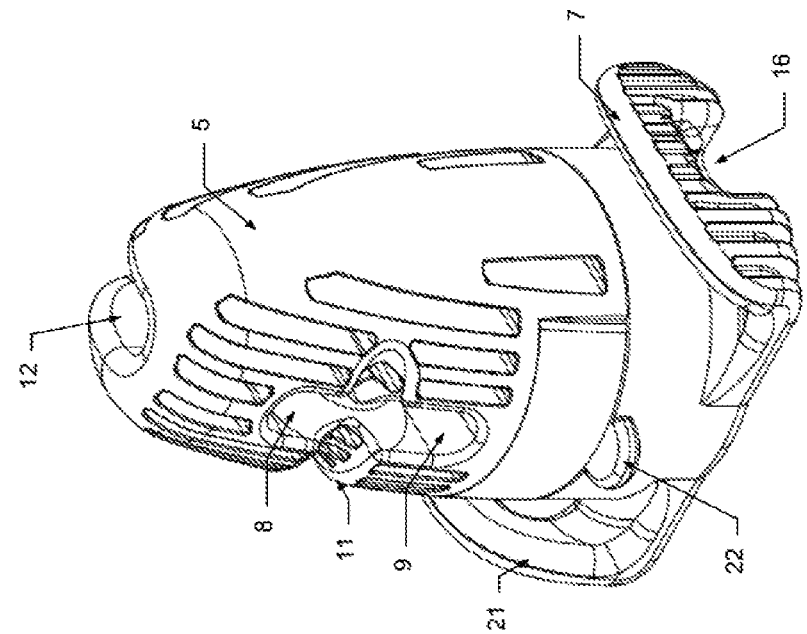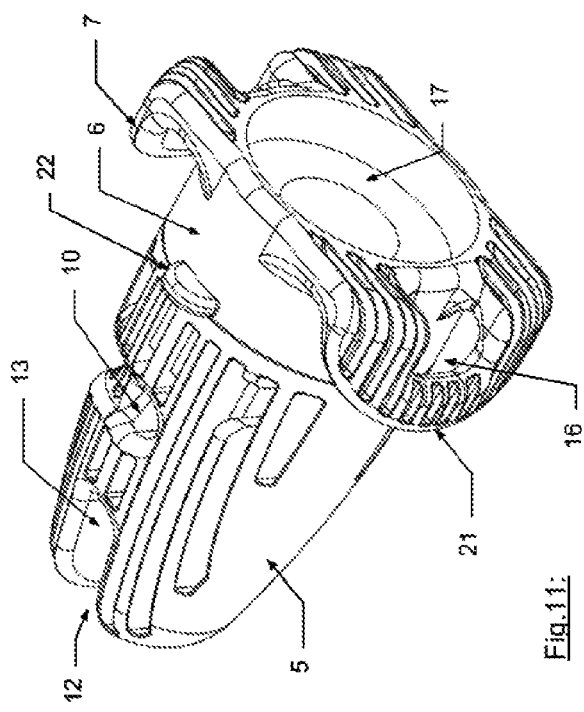

SUSPENSION DEVICE FOR HANGING SEATS AND HAMMOCKS

RELATED APPLICATIONS

The present application claims the priority of German Application No. 10 2018 113 371.5, filed Jun. 5, 2018, which is incorporated herein by reference in its entirety.

The invention relates to a suspension device for hanging seats and hammocks according to the preamble of Claim 1.

In the case of the suspension of hanging seats and also of hammocks, height adjustment is regularly necessary with reference to the suspension ropes used in dependence on the size and also the weight of a person utilizing the hanging seat or the hammock. In practice, frequently just the suspension rope or a suspension chain is shortened in a corresponding manner for this purpose in order to bring about a change in length, which is why frequently multiple attempts are necessary or a corresponding adaptation is not performed at all because the adjustment is all too cumbersome.

Precisely, however, when the hammocks or hanging seats are used by different persons or also in the case of hammocks or hanging seats which are not suspended permanently at just one site, but are to be utilized again and again at different fastening points, for example in the case of travel hanging seats or travel hammocks, said adjustment of the length of the suspension rope is a recurrent activity as the fastening points of the suspension ropes can also vary strongly, which is why technical solutions for easier length adjustment of the suspension ropes are also already disclosed in the prior art in this regard.

Thus, for example, the prior art DE 20 2011 105 048.8 discloses a hammock suspension device which consists of a body, through which the holding rope is guided, on the one hand, through several apertures, wherein a holding loop is formed from the holding rope which is able to be suspended, in turn, in a receiving means on the hammock device once said loop has been guided through the fastening loop on the hammock or the hanging seat. In this respect, said body serves for the purpose, in the case of a holding rope, of making possible a certain rope guide which enables flexible length adjustment.

In this connection, it has proved to be disadvantageous, however, for the special rope guide on said hammock suspension device to require a certain amount of practice and consequently not to be able to be operated by the user in a manner that is always satisfactory.

A further disadvantage is that the rope guide on said hammock suspension device has to be loosened at several points for changing the length of the holding rope and the rope has to be guided through said apertures in order to achieve the desired adjustability.

Further publication DE 20 2013 104 462 U1 discloses a hammock suspension device for the guiding and length adjustment of a holding rope, which hammock suspension device is realized in a similar manner to the afore-described suspension and comprises a receiving means for the suspending of a holding loop, a suspension loop, in which the end hammock loop is held, being formed by said hammock suspension device and the holding rope which is guided therein. This means that the free end of the holding rope is guided through the hammock loop and is then suspended again in the hammock suspension device by way of an end loop.

In order to achieve the adjustability and the releasable fixing of the hammock suspension device on the guide rope here, a special deflection of the holding rope in the guide in the hammock suspension device is disclosed where the, in particular, one deflection of the holding rope in a guide channel, which extends in the hammock suspension device, causes, under the tensile loading produced by a person lying in the hammock, on account of the holding guide that is present, the friction in the hammock suspension device to prevent the holding rope from slipping and consequently as a result of a displacement of the holding rope inside the hammock suspension device, a different length of holding rope with reference to the suspended hammock can be brought about.

The feature common to the two described, perfectly functional suspension devices is that the holding rope, with its free end guided through the suspension device, is guided through the suspension loop on the hammock or the hanging seat and is then fastened, in turn, on the suspension device. In this connection, for both solutions shown, an end loop is to be arranged on the suspension rope, which loop is then hooked in a hook-like suspension region on the suspension device, as a result of which the fastening of the hammock loop in said newly formed loop is ensured. Said devices are also displaced sharply when the rope is shortened and are thus difficult to reach for the user depending on the use.

It is desirable then, however, fundamentally in particular when hammocks and hanging seats are used by children, to provide as few safety hazards as possible on both the hammocks and the hanging chairs themselves and also on the suspension device. In the case of known child hanging seats, such safety hazards have largely been removed already. Consequently, the forming of a loop in the region of the suspension of the hammock by the suspension rope causes problems and, in this connection, can potentially represent such a safety hazard, which is why it is also desirable to avoid such suspension loops.

In addition, the prior art discloses a plurality of technical devices which serve for the tensioning of cables and ropes or for the releasable connection thereof. Frequently, in this connection, mechanical, for example spring-loaded fixing elements are used, such as, for example, in publication U.S. Pat. No. 5,950,556 where a retaining pin has to be pressed against a spring force in order to move a rope through said device. When said fastening means is released again, the rope is fixed in the device. Other frequently used devices are used for tensioning a rope, as utilized, for example, when guying a tent. Publication U.S. Pat. No. 4,222,157, where a device for tensioning a rope is disclosed, is named as an example in this regard.

Such applications are functional for tensioning ropes in the camping sector insofar as they are not exposed to any large loads, a weight loading of a hammock or a hanging seat which is designed for 150 kilograms and more cannot, however, be taken up by such a device. The shortening of the rope would certainly be adjustable, however only with serious wear caused by the twisting process on the rope. Common to said solutions here too is that the forming of a loop for guiding the rope, considered as problematic, persists.

It is, consequently, the object of the present invention to create a suspension device for hanging seats and hammocks which, on the one hand, produces an easily length-adjustable connection between the free end of a suspension rope and the holding loop of a hanging seat or of a hammock, wherein this is to be effected by avoiding forming a loop with the suspension rope with said hammock suspension device and the device is to remain easily reachable. At the same time, the suspension device is to make it possible for the hanging seat and hammock to be movable in a flexible manner.

This is achieved according to the invention by a suspension device for hanging seats and hammocks according to Claim 1.

The further claims consist of advantageous designs of the invention.

The basic idea for realizing the suspension device according to the invention consists in this connection in dividing the basic body of the suspension device into two functional regions, namely into an upper part which serves for receiving the suspension rope and allows, as a result of a special arrangement of apertures, for a length-adjustable arrangement of the suspension rope without it being additionally necessary to form a loop again for this purpose.

A lower part, which serves for receiving the connection to the hammock or the hanging seat, is then attached on said upper part. In this connection, the new approach is that said lower part is a body in its own right which is mounted so as to be movable on the upper part, such that the desired flexibility with reference to the movements of the hammock or of the hanging seat is able to be brought about by said movable connection to the upper part.

For the suspension on a suspension rope, in an advantageous design the upper part comprises two apertures for this purpose, the first of which comprises an inlet opening which is introduced centrally in the top surface of the upper part as the tensile direction of the, for example, suspended hanging seat leads to a guide at the top in the suspension device for protecting the suspension rope. In order then to achieve secure fastening of the suspension rope in the upper part, the suspension rope, introduced at the top into the first aperture, is deflected and guided out of the upper part at the side.

A second aperture runs transversely through the upper part below said outlet opening such that the suspension rope emerging out of the outlet opening of the $1^{st}$ aperture is introduced directly into the inlet opening of the second aperture lying below it and can emerge from the upper part on the opposite side of said upper part. Consequently, a level of stability is already achieved in a certain manner as a result of the rope guide which in no way, however, can suffice in order to ensure secure suspension.

For this purpose, then, it is provided according to the invention to guide the free end out of the outlet opening of the second aperture around the side of the upper part and to guide it into the intermediate region between the outlet opening of the first aperture and the inlet opening of the second aperture. A rope portion is on the outside of the upper part as a result of the rope guide and the free end of the suspension rope is able to be guided under said rope portion. When said suspension is loaded with weight, this leads to the suspension rope being pulled tautly into the suspension device and consequently the free end of the rope guided through under the side portion of the rope being pressed onto the upper part of the suspension device such that it is no longer possible for the suspension rope to slip out of the suspension.

At the same time, the simple change in length is to be achieved as a result of the suspension rope being guided further through the first aperture and introduced into the second aperture, for example for shortening the distance to a suspension point. The free end has then just to be pulled through even further under the external rope portion such that the rope is taut once again.

The characteristic of length adjustability is reinforced even further in an advantageous design of the invention as a result of the inlet opening into the first aperture not being introduced into the basic body just as a bore but being realized as slot-shaped recesses which extend to the side walls of the upper part. This results in the top-side suspension rope being able to be pressed to the side into said slot and consequently being guided vertically in the upper part of the basic body from the right-angled deflection situation into a straight guide situation. In this way, it can easily be pulled through the outlet opening of the first aperture in order either to lengthen or to shorten the suspension.

In order to ensure the addressed securement of the free rope portion between the outlet opening of the first aperture and the inlet opening of the second aperture, the distance between said inlet and outlet openings is chosen such that it corresponds to at least the diameter of the apertures themselves. This is because the apertures are designed corresponding approximately to the diameter of the suspension rope used in order to bring about a secure hold of the suspension device. In order then to guide the suspension rope through between the apertures, the distance between said two openings should correspond at least approximately to the rope diameter and should be present in this respect analogously to the diameter of the apertures.

In an expedient design, said distance corresponds approximately to the diameter of the apertures. There is, however, also a certain variability in this connection.

In a further advantageous configuration, said securement of the suspension rope is improved further as a result of a guide channel which, proceeding from the outlet opening of the second aperture, runs into the region between the outlet opening of the first aperture and the inlet opening of the second aperture. In this way, the free end of the suspension rope, which certainly emerges from the outlet opening of the second aperture, is placed into said guide channel, which extends in a recessed manner in the basic body of the upper part and is consequently guided securely into the intermediate region between the outlet opening and the inlet opening and is there also arranged in the upper part in a recessed manner.

This also supports the use of the suspension, on the one hand, as the user is able to see by said channel where the suspension rope is to be guided in order to secure it against slipping through the suspension. On the other hand, it also strengthens the effect of the holder as the rope has an ideal progression on the outside surface of the suspension device.

In an advantageous design, the lower part is connected to the upper part so as to be movable to the extent that it is a structure that is mounted on the upper part so as to be rotatable. In this connection, it is provided in an expedient design that a ball bearing, which brings about the rotatable connection between the lower part and the upper part, is arranged between the upper part and the lower part.

This can be achieved structurally in an expedient manner as a result of an approximately ring-shaped step, on which the ball bearing rests rotatably, being arranged on the underside of the upper part. In order then to produce the connection to the lower part, the lower part engages behind said step with a circumferential upper edge and consequently rests by way of said upper edge on the ball bearing such that the ball bearing is arranged between the upper edge of the lower part and the step arranged on the underside of the upper part.

It has proved to be advantageous from a point of view of production for the ball bearing to be arranged on its own support body which is introduced into the lower part first of all and reaches through said lower part. Consequently, the lower part already rests by way of its upper edge on the ball bearing which is also arranged on the underside step of the support body. Said support body with the lower part already arranged thereon is then inserted in a receiving means into the upper part and is fastened there. For example, this can be effected by a sturdy plug fastening.

The holding body, which is arranged in the lower part and serves for the fastening of the hammock or of the hanging seat, is fastened in an expedient manner, in this connection, on the lower part so as to be releasable. In this way, the holding body, when connecting the suspension device for example to a loop on the top of a hanging seat, can first of all be removed from the lower part in order then to be guided through the loop of the hanging seat which is inserted into the receiving device and connected to the lower part again. The achievement here in this way is that the hanging seat or the hammock is able to be inserted directly into the lower part of the suspension device.

An advantageous possible design of said construction provides that the holding body is realized as an axle body with at least two parts which, by means of a releasable plug connection, is first of all able to be opened and pulled out of the lower part and once the holding loop of a, for example, hanging seat has been inserted, can be re-inserted into the corresponding openings in the lower part of the suspension.

In this connection, it is provided in the case of an axle-like realization of the holding body that the lower part comprises lateral openings into which the holding body can be inserted. I.e. the axle-like holding body is first of all released and removed out of the lower part of the suspension, then the holding loop of the hanging seat is introduced into the now free space between the receiving means of the lower part in order finally to re-insert the axle serving as a holding body into the openings in the underside of the lower part and consequently to fasten the holding loop fixedly in the lower part of the suspension.

An alternative design provides that the holding body does not extend as an internal axle in the lower part but the at least 2 holding bodies exist as externally arranged, further holding collars with receiving means, by means of which then on both sides a suspension loop for example of a hanging seat or also further suspension ropes are able to be placed. This is because in the case of use in conjunction with hanging seats which bear spreaders, other requirements concerning the suspension device exist.

Where suspension is on a spreader, it is fundamentally such that two holding ropes with loop-like ends proceeding from the respective end of the spreader have to be joined and held at a central point above the hanging seat. This can be achieved in simple applications by simple spring hooks. In the advantageous suspension device according to said invention, however, it is provided that the suspension loops are introduced into the respective side holding bodies through apertures.

It is provided in one design, in this connection, to realize said side receiving means as holding collars which stand out to the side from the lower part, onto which, for example, a further suspension rope is able to be placed. Further explanations in this respect can be found in conjunction with the figures.

The invention is explained in more detail below by way of drawings, in which:

FIG. 3 shows a side view of the suspension device 1 turned by 90 degrees with an axle-like holding body 7;

FIG. 4 shows a section B-B through the suspension device according to FIG. 3;

FIG. 7 shows a side view of a second design of the suspension device with holding collars 21 and holding body 7;

FIG. 8 shows a section A-A through FIG. 7;

FIG. 9 shows a side view of the second design of the suspension device 1 turned by 90 degrees with side holding collars 21;

FIG. 10 shows section B-B through the second design of the suspension device according to FIG. 9;

FIG. 11 shows a perspective bottom view of the second design of the suspension device 1 with side holding collars 21 and FIG. 12 shows a perspective side view of the second design of the suspension device 1.

Figure 1:
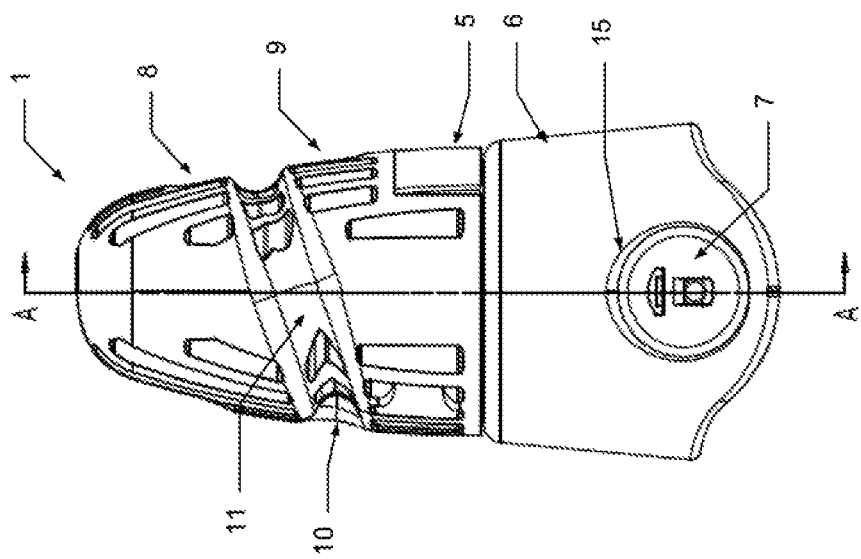
FIG. 1 shows a side view of a first design of the suspension device with an axle-like holding body 7.
Figure 6:
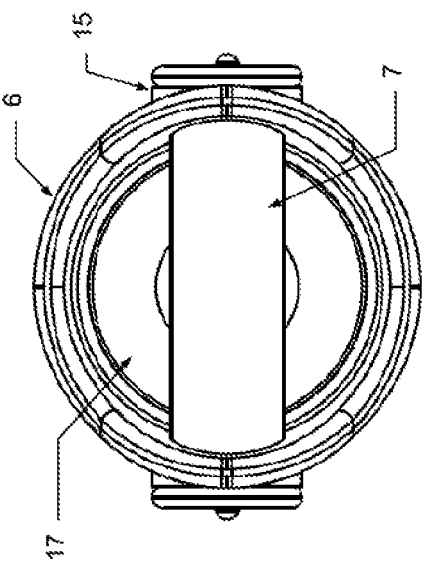
FIG. 6 shows a view from below of the holding body 7 of the axle design of the suspension device 1.
Figure 5:
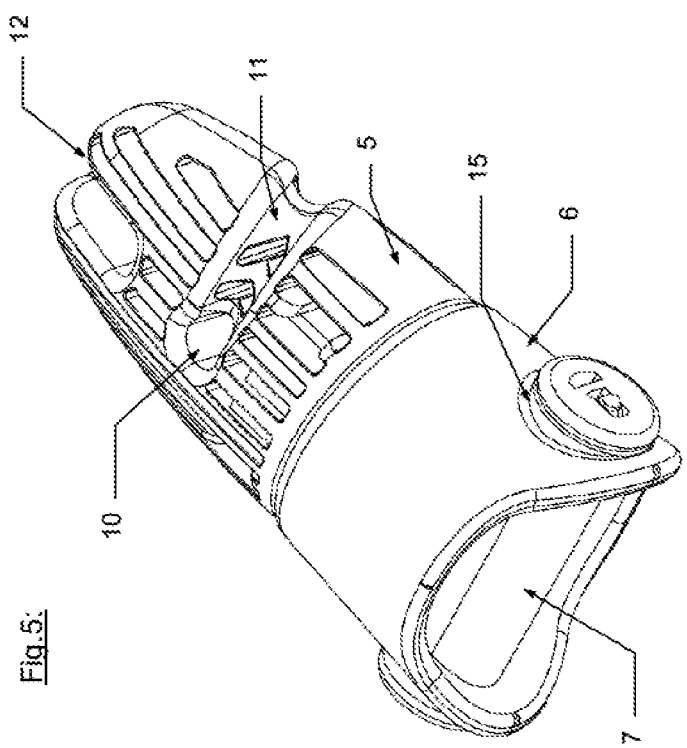
FIG. 5 shows a perspective view of the first design of the suspension device 1 with an axle-like holding body 7.

FIG. 1 shows a side representation of the suspension device which is formed by a basic body 1 which is composed of an upper part 5 and a lower part 6, said two elements being connected together in a movable manner. The upper part and the lower part fulfill different tasks in this connection insofar as the upper part 5 serves for receiving the holding rope, which is not shown in the drawing and is fastened, for example, in a space on a wall or ceiling or also outdoors on a tree.

The lower part 6 serves for receiving the fastening elements which are arranged on a hanging seat or also a hammock, for example the loop-like ends themselves or ropes which proceed from the loop-like ends of the hanging seats or hammocks.

In this connection, FIGS. 1 to 6 show a first design of the invention where an axle-like holding body 7 is arranged in the lower part 6, said axle-like holding body itself serving for receiving a loop of a hanging seat or of a hammock. Said first design, in this connection, is primarily provided for suspensions where just one loop centrally serves for the suspension, for example as is the case with a hanging seat with the loop fastening on the top side in contrast to suspensions on spreaders. The suitability of the second design will be explained subsequently.

Figure 2:
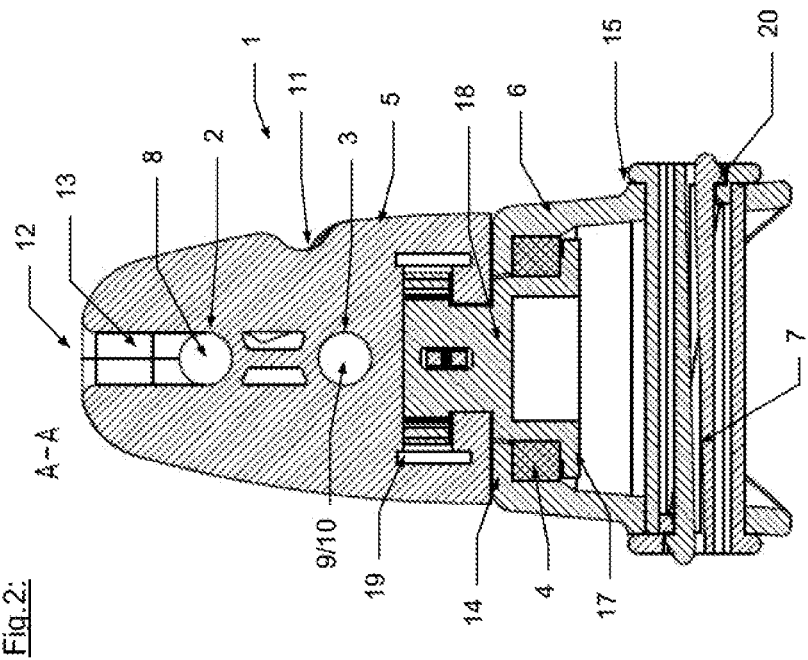
FIG. 2 shows a section A-A through FIG. 1.

The axle-like holding body 7, which is guided through side openings 15 in the lower part, comprises, as shown in FIG. 2, two nestable individual bodies joined by means of a plug connection 20. This means that as a result of releasing the plug connections 20, the two components of the holding body 7, which are separate from one another, can be pulled out of the lower part 6 through the openings 15 to each side.

It is possible then to introduce a closed holding loop, which is arranged, for example, directly on the hanging seat, into the receiving means of the lower part 6 and to connect the holding body 7 by plugging together the components forming the axle and consequently to achieve the fixed connection between the lower part 6 and an inserted loop.

It can also be seen in the sectional representation in FIGS. 2 and 4 how the connection is achieved between the upper part 5 and the lower part 6 such that the lower part is mounted on the upper part so as to be rotatable. It is provided for this purpose that a bearing arrangement is arranged between the lower part 6 and the upper part 5, in said exemplary case a ball bearing 4, as a result of which the lower part 6 is able to rotate freely in relation to the upper part 5. For this purpose, it is structurally provided that a support body 18 is fastened on the upper part 5, which support body comprises a step 17 on the underside, on which step the ball bearing 4 is able to rest. The lower part with an upper edge 14 which engages over the ball bearing is then guided on the top side of said ball bearing, as a result of which the rotatable bearing arrangement between the upper part 5 and the lower part 6 is created.

In the design shown, the support body 18 is insertable into a corresponding receiving means 19 in the upper part 5 for this purpose. In this way, an assembly is possible where the support body 18 is inserted first of all into said lower part 6 with the ball bearing fitted through a corresponding receiving means in the lower part 6. The connecting region between the support body 18 and the upper part 5 which then projects out of the top of the lower part 6, as can easily be seen in FIG. 2, can then be slid to the side into the corresponding receiving means 19 in the upper part, finally being fixed in the upper part 5 as a result of inserting a locking plate 23 into the receiving means 19 in the upper part 5. In this respect, the support body 18 is then fixedly connected to the upper part 5 and the rotatable bearing arrangement of the lower part 6 and of the upper part 5 is brought about.

The basic body form of the basic body 1 consisting of upper part 5 and lower part 6 is realized in an approximately truncated cone-like manner, said basic form widening from the narrower head of the upper part 5 toward the receiving means on the lower end of the lower part 6.

The upper part 5, in this connection, comprises a special rope guide for the receiving of an easily adjustable holding rope in order to adapt the suspension in this way to the corresponding person who would like to use the hanging chair or the hammock. In this connection, FIG. 1 shows a side view of a guide channel 11 which serves for the purpose of guiding the holding rope, which is guided in the upper part 5 and is not depicted, around the lateral surface of the upper part 5 in a fixed manner and of moving it into a certain holding position, which will be explained further below.

In this connection, the rope guide provides that the holding rope is introduced into said suspension device in inlet opening 12 along the longitudinal axis of the suspension device as said holding rope can be handled in a protective manner in this way. A deflection of the holding rope in a recess 13, which extends to the side wall, is then effected in the upper head of the upper part 5 toward a first side outlet opening 8, an inlet opening 9 of a second aperture 3 being arranged under said outlet opening 8 at a distance which corresponds to at least the diameter of the apertures 2 and 3. An external loop portion of the holding rope is thus formed between the outlet opening 8 and the inlet opening 9.

The view of said apertures 2 and 3 is easily seen in FIG. 3. It is consequently such that the suspension rope is introduced at the top through an insertion opening 12 into a recess region 13 and emerges out of said recess region through the outlet opening 8. The rope is then re-introduced directly below into the upper part into the second aperture 3 and its inlet opening 9 and emerges again through the channel guide, which can be seen well in FIG. 4, out of the outlet opening 10 of the second aperture 3.

Looking at FIG. 1, it becomes clear that after leaving the outlet opening 10, the holding rope is returned in the slightly upwardly inclined guide of the guide channel 11 into a space between the outlet opening 8 and the inlet opening 9. As a result of the partially recessed arrangement of the holding rope in the guide channel 11, the free holding rope end is now guided through under the loop-like, external holding rope portion which spans the transition produced by the outlet opening 8 and the inlet opening 9. The free end of the holding rope is held accordingly here and with tensile loading is pressed fixedly and is fixed against the outer lateral surface of the upper part 5 of the suspension device.

The achievement in this way is that it is impossible for the holding rope to slide out of said upper part 5 of the suspension device unintentionally.

At the same time, it is also achieved that as a result of the special design of the inlet opening with the sideways extending recess 13, it is possible to deflect the holding rope from the longitudinal direction of the suspension device into a transverse direction when it enters into the upper part of the suspension device, it thus being easily possible to track the holding rope and consequently to shorten the holding rope when adjusting the suspension length. The rope can then be guided out without being deflected precisely at the outlet opening 8 of the first aperture 2 and can be tightened correspondingly by the further holding rope guide. The achievement is thus that simple adjustability of the length of the holding rope is readily achievable.

The advantage of the rotatable bearing arrangement of the lower part and of the upper part is additionally that in particular when used in conjunction with hanging seats, free rotatability of the hanging seat on the suspension is possible and consequently the person sitting in the hanging seat is thus able to orientate himself as desired. In this way stresses, which would otherwise arise in the holding ropes when the suspension device is rotated in certain directions, can also be avoided.

FIGS. 7 to 12 show a second design; the difference thereof being based on the fact that the holding body 7 on the lower part 6 is realized in another manner. In the present case there are two side holding bodies 7 which enable an arrangement of two holding ropes on said suspension device. This is because when used in conjunction with hanging seats which support spreaders, other requirements are asked of the suspension device.

In the case of suspension on a spreader, it is fundamentally such that two holding ropes with loop-like ends proceeding from the respective ends of the spreader have to be joined together and held at a central point above the hanging seat. This can be achieved in simple applications as a result of simple spring hooks. In the advantageous suspension device according to said invention, however, it is provided that the suspension loops are introduced into the respective side holding bodies 7 through apertures 16. The holding bodies 7, in this connection, are realized as holding collars 21 and, which can be easily seen in FIGS. 9, 11 and 12, comprise receiving means 16, by means of which it is possible to guide the loop-like ends of the holding ropes which, proceeding from both ends of the spreader, are to be connected.

The loops are consequently guided through said receiving means 16 and can then be placed over the upper part 5 of the suspension device from both sides. This is easily understandable in conjunction with FIG. 12 as here the holding body 7 with the internal receiving means 16 can be seen, which holding body then receives the loop-like holding rope end which can then be placed over the upper part 5 of the suspension device and consequently hooked on the opposite holding collar 21. The loop size is to be chosen correspondingly such that it is easily able to be placed over the upper part 5 and thus surrounds the basic body 1.

From the opposite receiving means 16 in the holding body 7, the second loop end of the spreader is inserted in an analogous manner hereto and is placed, in turn, over the upper part 5 of the suspension device from the opposite side and consequently hooked on the holding collar 21 of the holding body 7 on the opposite side. The two loops of the two ends of the holding ropes consequently lie one on top of the other on the lower part 6 of the second design of the suspension device and are held down in their position by the holding collars 21 of the holding bodies 7 and by at least two projections 22 which extend to the side on the upper edge of the lower part 6.

The loop ends are also pulled down onto the lower part by tensile loading during use so that there is no need to worry about them slipping out into the region of the upper part 5 unintentionally. The holding loops placed over the upper part 5 slipping off can also be safely excluded as a result of the holding rope being guided into the upper part 5 for suspension once the loops of the spreader have been attached to the lower part 6 and consequently this also prevents the holding loops resting on the lower part 6 being able to slip off the suspension device again.

The further structural features with reference to the upper part 5 in the case of the second design of the suspension device coincide with those of the first design. This means that here too there is an approximately truncated cone-like basic body which widens from the upper portion of the upper part toward the lower edge of the lower part. In the second design, in this connection, another approximately collar-shaped lateral continuation of the holding bodies 7 or holding collars 21 is provided which does not exist in this way in the first design, since in the case of the first design, the axle-like holding body 7 assumes the function here in its stead.

The invention claimed is:

1. Suspension device for hanging seats and hammocks comprising:
    a basic body having apertures defined therein for receiving and guiding a suspension rope, wherein
    the basic body comprises at least two parts and is composed of an upper part which receives the suspension rope so as to be length-adjustable and a lower part which is mounted on the upper part so as to be movable and comprises at least one holding body for fastening of the hanging seat or the hammock,
    the upper part of the basic body defines a first aperture having an inlet opening and an outlet opening, the first aperture enters into the upper part of the basic body at the inlet opening for receiving and guiding the suspension rope and exits out of said upper part from the outlet opening, and
    the upper part of the basic body defines at least one second aperture having a second inlet opening and a second outlet opening, the second aperture extending in the upper part of the basic body and exiting from said upper part on two sides by way of the second inlet opening and the second outlet opening below the outlet opening of the first aperture.

2. Suspension device for hanging seats and hammocks according to claim 1 wherein the outlet opening of the first aperture is at a distance from the second inlet opening of the second aperture, wherein the distance equals a diameter of the apertures.

3. Suspension device for hanging seats and hammocks according to claim 1, wherein a guide channel for the suspension rope, which channel extends in a recessed manner in the upper part of the basic body, is arranged in a guiding manner from the second outlet opening of the second aperture between the outlet opening of the first aperture and the second inlet opening of the second aperture.

4. Suspension device for hanging seats and hammocks according to claim 1, wherein the inlet opening of the first aperture is realized as an elongated recess which extends to a side wall of the upper part of the basic body.

5. Suspension device for hanging seats and hammocks according to claim 1, wherein the lower part of the basic body is rotatably mounted on the upper part.

6. Suspension device for hanging seats and hammocks according to claim 1, wherein a ball bearing is arranged between the upper part and the lower part of the basic body.

7. Suspension device for hanging seats and hammocks according to claim 6, wherein the ball bearing rests on an underside step of the upper part, wherein the lower part engages in said step by way of a circumferential upper edge and rests rotatably on the ball bearing.

8. Suspension device for hanging seats and hammocks according to claim 7, wherein a support body for the ball bearing, forming the underside step, is inserted fixedly with its underside into a receiver of the upper part of the basic body and is fastened.

9. Suspension device for hanging seats and hammocks according to claim 1, wherein the holding body is releasably fastened in the lower part of the basic body.

10. Suspension device for hanging seats and hammocks according to claim 1, wherein the holding body, which is realized as an axle with at least two parts which are connected together by a plug connection, is releasably fastened in the lower part of the basic body.

11. Suspension device for hanging seats and hammocks according to claim 1, wherein the lower part comprises at least two side openings for receiving the holding body.

12. Suspension device for hanging seats and hammocks according to claim 1, wherein the lower part comprises at least two side holding bodies with receiver for the insertion of loop ends of the holding rope of the hanging seat or of further suspension ropes.

13. Suspension device for hanging seats and hammocks according to claim 12, wherein the holding bodies on the lower part of the basic body comprise side holding collars with receiver for receiving and supporting said loop ends of the holding rope of the hanging seats or of further suspension ropes.

14. Suspension device for hanging seats and hammocks according to claim 12, wherein side projections for fixing hooked fastening loops of the hammocks or hanging seats or of further suspension ropes are arranged on the lower part of the basic body.

* * * * *